United States Patent [19]

Smith

[11] 4,098,973
[45] Jul. 4, 1978

[54] COMPOUNDS AND PROCESS

[75] Inventor: Curtis P. Smith, Cheshire, Conn.

[73] Assignee: The Upjohn Company, Kalamazoo, Mich.

[21] Appl. No.: 764,376

[22] Filed: Jan. 31, 1977

[51] Int. Cl.$^2$ .......................... C08F 8/22; C08F 8/24; C08F 8/42
[52] U.S. Cl. ........................................ 526/21; 526/43; 526/46; 526/240; 526/346; 526/44; 526/47; 528/552
[58] Field of Search ................. 526/21, 46, 43, 346, 526/240

[56] References Cited

U.S. PATENT DOCUMENTS

| | | | |
|---|---|---|---|
| 3,970,603 | 7/1976 | Gray | 526/46 X |
| 3,995,094 | 11/1976 | Crosby et al. | 526/46 X |

*Primary Examiner*—William F. Hamrock
*Attorney, Agent, or Firm*—Denis A. Firth; John Kekich

[57] ABSTRACT

Modified polystyrenes are described which are catalysts for the conversion of organic isocyanates to the corresponding carbodiimides. The modified polystyrenes are characterized by the presence of recurring units of the formula:

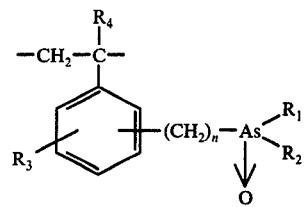

$R_1$ and $R_2$ are hydrocarbyl which is free of substituents reactive with isocyanate groups, $R_3$ is hydrogen, chloro or methyl, $R_4$ is hydrogen or methyl, and n is 0 or 1.

The use of the above polymers to catalyze the formation of carbodiimides from organic isocyanates is also disclosed.

3 Claims, No Drawings

COMPOUNDS AND PROCESS

BACKGROUND OF THE INVENTION

1. Field of the Invention

This invention relates to modified polystyrene polymers and is more particularly concerned with organoarsenic derivatives of polystyrene and with processes for their preparation and processes for their use as catalysts for converting isocyanates to carbodiimides.

2. Description of the Prior Art

It is known that certain trihydrocarbyl arsine oxides, of which triphenylarsine oxide is typical, are useful as catalysts for the conversion of organic isocyanates to carbodiimides; see, for example, Monagle, J. Organic Chemistry, 27, 3852, 1962. It has also recently been disclosed (see German Offenlegenschrift 2,504,334 and 2,504,400) that certain phospholane-phosphonic acid salts of amino-modified polymers can be employed as catalysts for the same reaction.

We have now found that certain organo-arsenic derivatives of polystyrene are highly effective catalysts for the conversion of organic isocyanates to the corresponding carbodiimides and are possessed of marked advantages when employed for this purpose.

SUMMARY OF THE INVENTION

This invention comprises polymers characterized by the presence therein of a recurring unit having the formula:

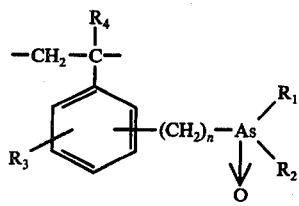

wherein $n$ is 0 or 1, $R_1$ and $R_2$ each independently represents hydrocarbyl, said hydrocarbyl being free of substituents which are reactive with isocyanate, $R_3$ is selected from the group consisting of hydrogen, methyl and chloro, and $R_4$ is selected from the group consisting of hydrogen and methyl.

The invention also comprises processes for the preparation of the above polymers and a process for the conversion of organic isocyanates to carbodiimides.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like including isomeric forms thereof; and cycloalkenyl such as cyclopentenyl, cyclohexenyl, cycloheptenyl, cyclooctenyl, and the like, including isomeric forms thereof.

The hydrocarbyl groups which form the groups $R_1$ and $R_2$ can be substituted by one or a plurality of substituents provided the latter are not reactive with isocyanate groups. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

DETAILED DESCRIPTION OF THE INVENTION

The polymers of the invention, which are characterized by the presence of the recurring group (I), are obtained by chemical modification of at least some of the recurring units of a polystyrene or by first introducing the appropriate organoarsenic substituents into the benzene ring of a styrene monomer and then polymerizing or copolymerizing the monomer.

Illustratively, the polymers of the invention can be prepared from the corresponding polystyrene using the following sequence of steps. The starting polystyrene is converted to the corresponding nuclear brominated or chloromethylated derivative using the procedures described by Relles et al., JACS, 96, 6469, 1974. The bromination of the polystyrene is accomplished by reacting the latter with bromine in the presence of a catalyst such as boron trifluoride. The chloromethylation is achieved by reacting the polystyrene with chloromethyl methyl ether in the presence of boron trifluoride. By appropriate choice of the molar proportions of bromine or chloromethyl methyl ether to polystyrene it is possible to introduce a bromo or chloromethyl group into any given proportion or all of the benzene nuclei in the polystyrene.

The intermediate bromo or chloromethylated polystyrene so obtained is then reacted with the appropriate dihydrocarbyl arsine halide, $R_1R_2AsHal$ wherein $R_1$ and $R_2$ have the significance hereinbefore defined and Hal represents chloro, bromo or iodo. The reaction is carried out in the presence of lithium using the conditions described by Relles et al, supra, for the analogous condensation of the bromo and chloromethylated polystyrenes with chlorodiphenylphosphine. Illustratively, the reactants are brought together in the presence of a solvent such as tetrahydrofuran, dimethylformamide, dimethylacetamide, tetramethylene sulfone, cyclohexane, benzene, toluene, and the like, and the mixture is maintained under an inert atmosphere such as nitrogen while an excess of metallic lithium, advantageously in the form of newly extruded wire, is added. The reaction is generally conducted at ambient temperature (20° – 25° C) but higher temperatures, e.g. temperatures up to about the reflux temperature of the solvent, can be employed if desired.

Depending upon the nature of the polystyrene employed as starting material and upon the solvents employed, the above reactions are carried out with the polystyrene or polystyrene derivative in solution or present as an insoluble solid phase. Thus, where the starting material is a polystyrene which has not been crosslinked by copolymerization with, for example, a minor amount of divinylbenzene, the polystyrene is soluble in polar solvents and the above reactions can be carried out in solution. The final product is isolated by, for example, precipitation by the addition of an aliphatic alcohol such as methanol or like solvents in which the product is insoluble. On the other hand, where the starting polystyrene is not soluble to any substantial degree in polar or other solvents, the polystyrene is generally reacted, in the form of beads, powdered material, or other forms having relatively small particle size, in suspension with agitation as appropriate.

The organoarsine-substituted polystyrenes thus obtained are then subjected to oxidation using hydrogen peroxide or like oxidizing agents to obtain the final polymers having the recurring unit (I). The reaction can be carried out by dissolving or suspending the organoarsine-polystyrene in a solvent, such as those set forth above, and adding the oxidizing agent thereto. The reaction is advantageously carried out at ambient temperatures, but higher temperatures (up to about 60° or 70° C) can be employed if desired.

Any of the commonly available forms of polystyrene can be employed in preparing the polymers of the invention using the above series of reactions. The commonly available polystyrenes include the homopolymer of styrene itself, the copolymer of styrene and a minor amount of divinylbenzene (generally 2 percent by weight or less), the homopolymers of vinyltoluene, α-methylstyrene and chlorostyrene as well as the copolymers formed from two or more of the aforementioned monomers. For a detailed description of these various forms of polystyrene and methods for their preparation see, for example, Encyclopedia of Polymer Science and Technology, Vol. 13, p. 128 et seq., John Wiley and Sons, New York, 1970.

As mentioned above, it is possible to adjust the proportion of nuclear benzene rings in the starting polystyrene which are subjected to substitution by bromine or chloromethyl, followed by reaction with the organoarsine halide $R_1R_2AsHal$, so that from about 10% to about 100% of the recurring units in the resulting polymer having the formula (I) above. When less than 100% of the recurring units in the resulting polymer have the formula (I), the remainder of the recurring units in said polymer will obviously be those corresponding to the starting polystyrene. It will also be apparent that, by subjecting the intermediate bromo or chloromethylated polystyrene to reaction with less than the stoichiometric amount of one organoarsine halide $R_1R_2AsHal$ and then subjecting the product so obtained to reaction with a second and different organoarsine halide, it is possible to obtain a polymer of the invention which contains two different organoarsine residues in the molecule. Similarly, polymers having three or more different organoarsine residues in the molecule can be obtained by extension of the above reaction.

The organoarsine halides $R_1R_2AsHal$ which are employed in the preparation of the polymers of the invention are, for the most part, known compounds which can be prepared by procedures known in the art; see, for example, Chemistry of Carbon Compounds, Edited by E. H. Rodd, Vol. IA, p. 449, 1951 for aliphatic arsine halides; ibid, Vol. IIIA, pp. 404–5, 1954 for the aryl arsine halides, and the references cited therein.

In an alternative method of preparing the polymers of the invention having the recurring unit (I) a monomer of the formula

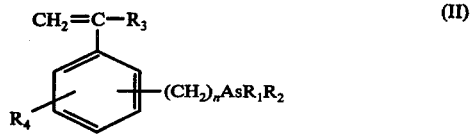

wherein $R_1$, $R_2$, $R_3$, $R_4$ and $n$ have the significance hereinbefore defined is homopolymerized or copolymerized with styrene, α-methylstyrene, chlorostyrene or vinyltoluene using methods well-known in the art, supra. The resulting organoarsine-substituted polymer is then subjected to oxidation to form the corresponding arsine oxide using the procedure described above.

The arsine-substituted monomers (II) are prepared by reaction of the appropriate nuclear-brominated or chloromethylated styrene monomer and the appropriate dihydrocarbylarsine halide $R_1R_2AsHal$ using the reaction conditions described above for the corresponding reaction involving the brominated or chloromethylated polystyrene.

In a further aspect of the present invention there is provided an improved process for the preparation of organic carbodiimides by heating the corresponding organic isocyanate in the presence of a carbodiimide-forming catalyst, the improvement lying in the use as catalyst of a polymer having the recurring unit (I) described above. The process can be applied to conversion of any organic isocyanate and it has the advantage over previously employed catalysts that the polymer catalyst always remains in a phase separate from the isocyanate and the resulting carbodiimide, and can be readily separated from the latter at the end of the reaction. Further, the use of the polymeric catalysts is readily adaptable to continuous type processes in which the organic isocyanate to be treated, optionally as a solution in an appropriate organic solvent, is passed through a supported bed or column of catalyst. The hold up time in the column is adjusted so that complete conversion, or any desired degree of conversion, can be achieved in a single passage through the column.

Any of the known organic mono or polyisocyanates can be converted to the corresponding carbodiimides using the novel polymeric catalysts of the invention. Illustrative of such isocyanates are methyl, ethyl, isopropyl, butyl, hexyl, octyl, octadecyl, allyl, 2-pentyl, cyclopentyl, cyclohexyl, 1-cyclopentenyl, 2-cycloheptenyl, benzyl, phenethyl, 3-phenylpropyl, benzhydryl, 2-naphthylmethyl, naphthyl, phenyl, p-tolyl, o-tolyl, 3-nitrophenyl, 4-methoxyphenyl, 4-allyloxyphenyl, 3,4-xylyl, 2-chlorophenyl, decahydronaphthyl, trifluoromethyl, 2-chloroethyl and 3-nitropropyl mono-isocyanates; 2,4-toluene, 2,6-toluene, hexamethylene, 4,4'-biphenylene, 3,3'-dimethoxybiphenylene-4,4'-diisocyanates, methylenebis(phenyl isocyanate) and the like, such as those listed in Siefkin, Ann. 562, 122–135, 1949.

In carrying out the conversion of the organic isocyanate to the corresponding carbodiimide, the organic isocyanate and the polymeric catalyst are brought together in the proportion of about 0.1 part by weight to about 10 parts by weight of catalyst per 100 parts of isocyanate. The reaction is advantageously carried out at elevated temperatures of the order of about 70° to about 200° C. The progress of the reaction can be followed readily by measuring the evolution of carbon dioxide which is eliminated in the reaction. Cessation of evolution of the gas generally indicates completion of the reaction. The resulting carbodiimide is then readily separated from the catalyst. The separation is facilitated by carrying out the reaction in the presence of an organic solvent in which starting isocyanate and the resulting carbodiimide are soluble. At the end of the carbodiimide forming reaction it is merely necessary to filter the catalyst from the reaction product. The catalyst can be reused any number of times withou losing activity.

The carbodiimides which are prepared in accordance with this aspect of the process of the invention are known compounds which are useful in preventing ageing and hydrolysis of elastomers; see, for example, U.S. Pat. Nos. 3,297,795 and 3,378,517.

The following examples describe the manner and process of making and using the invention and set forth the best mode contemplated by the inventors of carrying out the invention but are not to be construed as limiting.

EXAMPLE 1

A. The procedure of Relles et al, supra, for the bromination of polystyrene was repeated exactly as described. The polystyrene employed as starting material was 2% divinylbenzene cross-linked polystyrene (200–400 mesh: Eastman Kodak). The brominated product was found to contain 42.98 percent by weight of bromine indicating that 98.4 percent of the benzene nuclei in the polymer contained a bromine atom.

B. A suspension of 3.5 g (0.019 mole repeating units) of the brominated polystyrene (obtained as described above) in 90 ml. of tetrahydrofuran was stirred vigorously at ambient temperature (circa 20° C) while a solution of 10 g. (0.0378 mole) of diphenylarsine chloride in 30 ml. of tetrahydrofuran was added followed by 0.64 g. (0.09 g. atom) of lithium wire. The reaction mixture gradually turned orange-red. After stirring for 24 hr. the reaction mixture was then filtered. The solid which was isolated was washed by slurrying successively with 2:3, 3:1 and 9:1 mixtures by volume of methylene chloride and methanol and finally with pure methanol. There was thus obtained, as a pale yellow solid, an organoarseno-substituted polystyrene characterized by the following recurring unit:

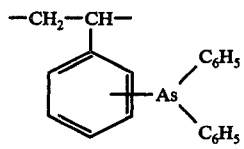

C. A suspension of 5.6 g. of the above organoarseno-substituted polystyrene in 50 ml. of acetone was stirred while 2.8 g. (0.025 mole) of 30 percent v/v hydrogen peroxide was added. The resulting mixture was then allowed to stand at room temperature (circa 20° C) for several days. At the end of this time there was added 50 ml. of benzene and the mixture was refluxed using a Dean and Stark apparatus to remove water azeotropically. The dried suspension was then filtered and the insoluble material was washed by slurrying successively with 3:1, 2:3, 3:1 and 9:1 mixtures by volume of methylene chloride and methanol and finally with pure methanol. The product was finally dried in an oven at 80° C. There was thus obtained a polymer characterized by the recurring unit

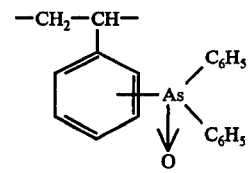

and having a content of arsenic of 20.485 percent.

EXAMPLE 2

Using the procedure described in Example 1, but replacing the diphenylarsine chloride employed in Step B by chlorodiethylarsine, chlorodimethylarsine, bromodicyclohexylarsine, and ethylphenylchloroarsine, there are obtained the corresponding oxides of the organoarseno polystyrenes.

EXAMPLE 3

Using the procedure described by Relles et al, supra, a 2% divinylbenzene cross-linked polystyrene (200–400 mesh: Eastman Kodak) is chloromethylated by reaction with chloromethyl methyl ether in the presence of boron trifluoride.

Using the procedure described in Example 1, part B, but replacing the brominated polystyrene there employed by the chloromethylated polystyrene prepared as described above, there is obtained the polystyrene characterized by the recurring unit

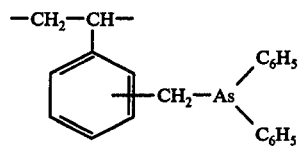

The latter is then oxidized using the procedure described in Example 1, part C, to obtain the corresponding oxide characterized by the recurring unit

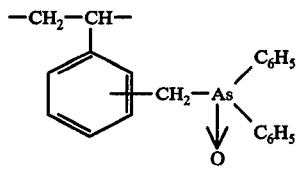

EXAMPLE 4

A mixture of 13.3 g. (0.1 mole) of o-tolyl isocyanate, 13.3 ml. of benzene and 0.1 g. of the organoarsineoxide-substituted polystyrene prepared as described in Example 1 was heated under reflux for 3 hours and then filtered to remove the polystyrene catalyst. The filtrate was distilled under reduced pressure to obtain 10 g. (90 percent theoretical yield) of di-o-tolylcarbodiimide having a boiling point of 135° to 137° C at 0.3 mm.

The polystyrene catalyst recovered from the above conversion was then used as catalyst in a second run using a further charge of 13.3 g of o-tolylisocyanate in 13.3 ml. of benzene. After heating the mixture under reflux for 2 hours the product was filtered to remove catalyst and the filtrate was distilled under reduced pressure to obtain 10.4 g. (93.6 percent theoretical yield) of di-o-tolylcarbodiimide having a boiling point of 123° to 127° C at 0.1 mm.

The polystyrene catalyst recovered from the above conversion was then used as catalyst in a third run with identical results.

I claim:

1. A polymer characterized by the presence therein of a recurring unit having the formula:

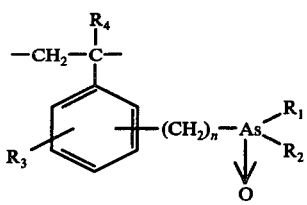

wherein $n$ is 0 or 1, $R_1$ and $R_2$ each independently represents hydrocarbyl, said hydrocarbyl being free of substituents which are reactive with isocyanate, $R_3$ is selected from the class consisting of chlorine, methyl and hydrogen and $R_4$ is selected from the class consisting of hydrogen and methyl.

2. A polymer according to claim 1 wherein the remainder of the recurring units present in said polymer are those of the formula:

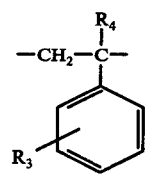

wherein $R_3$ and $R_4$ have the significance defined in claim 1.

3. A polymer according to claim 1 wherein $R_1$ and $R_2$ each represent phenyl.

* * * * *